(12) United States Patent
Suzuki

(10) Patent No.: US 7,646,521 B2
(45) Date of Patent: Jan. 12, 2010

(54) OPTICAL SCANNING DEVICE AND IMAGE FORMATION APPARATUS

(75) Inventor: Yoshiyuki Suzuki, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 267 days.

(21) Appl. No.: 11/785,334

(22) Filed: Apr. 17, 2007

(65) Prior Publication Data

US 2008/0042049 A1    Feb. 21, 2008

(30) Foreign Application Priority Data

Aug. 18, 2006    (JP) .............................. 2006-223085

(51) Int. Cl.
*G02B 26/08*    (2006.01)
(52) U.S. Cl. .................................. 359/205.1
(58) Field of Classification Search .............. 359/205.1, 359/206.1, 207.1, 207.2
See application file for complete search history.

(56) References Cited

U.S. PATENT DOCUMENTS

| | | | |
|---|---|---|---|
| 6,201,561 B1 * | 3/2001 | Ichikawa | ................. 359/197.1 |
| 6,437,897 B1 | 8/2002 | Inagaki | |
| 6,717,705 B2 | 4/2004 | Takakubo | ................... 359/207 |
| 2003/0081108 A1 | 5/2003 | Takeuchi et al. | |
| 2003/0128412 A1 | 7/2003 | Iizuka et al. | |
| 2003/0183747 A1 | 10/2003 | Takakubo | |

FOREIGN PATENT DOCUMENTS

| | | |
|---|---|---|
| JP | 10-73778 | 3/1998 |
| JP | 2001-4951 | 1/2001 |
| JP | 2003-5113 | 1/2003 |
| JP | 2003-5114 | 1/2003 |
| JP | 2003-149573 | 3/2003 |
| JP | 2003-185957 | 7/2003 |
| JP | 2004-294887 | 10/2004 |
| JP | 2005-91922 | 4/2005 |

* cited by examiner

*Primary Examiner*—Euncha P Cherry
(74) *Attorney, Agent, or Firm*—Morgan Lewis & Bockius LLP

(57) ABSTRACT

An optical scanning device includes: a light source; a first optical element that converts light emitted from the light source to parallel light; a deflection element that deflects the light in a fast scanning direction to scan a surface of an object to be scanned with the light at a constant speed; a second optical element that guides the light to the deflection element; and a third optical element that focuses the light deflected by the deflection element onto the surface of the object to be scanned, at least one surface among surfaces of the third optical element that intersect the light including a surface form which affects only one of fast scanning direction characteristics or slow scanning direction characteristics at an image plane.

11 Claims, 10 Drawing Sheets

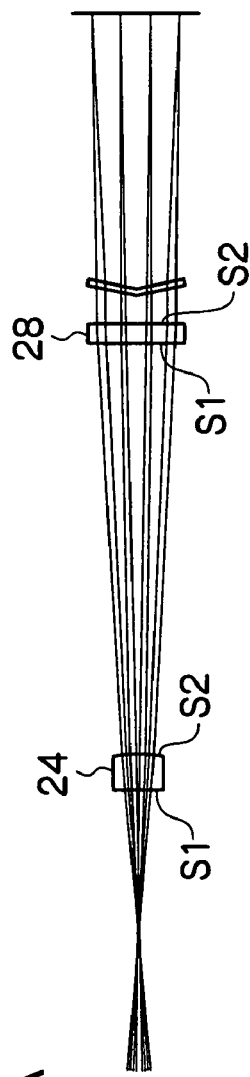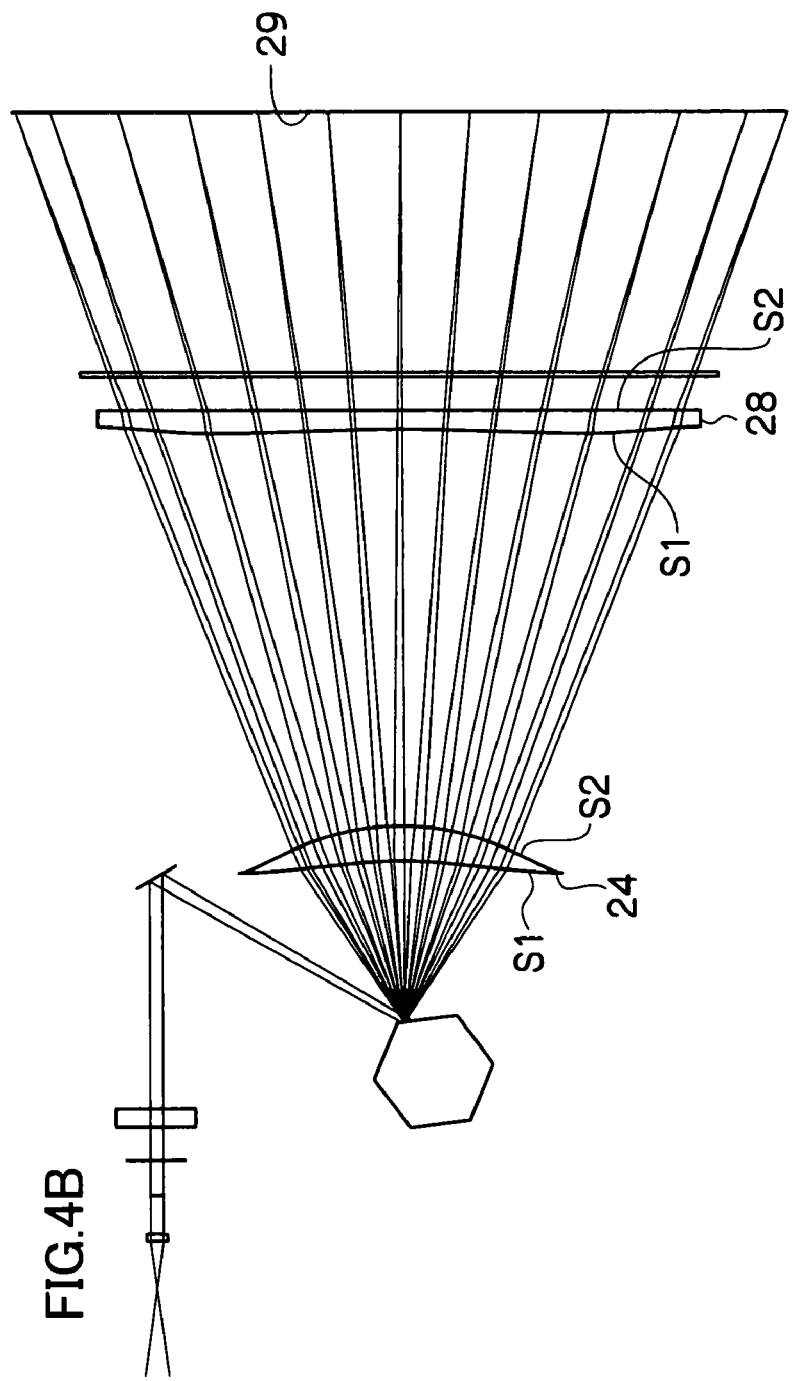
FIG.4A
FIG.4B

SURFACE FORMS S1: ANAMORPHIC ASPHERICAL SURFACE
S2: y TORIC SURFACE

S1: $$z = \frac{CUX \cdot x^2 + CUY \cdot y^2}{1+\sqrt{1-(1+kx)\cdot CUX^2 \cdot x^2 -(1+ky)\cdot CUY^2 \cdot y^2}}$$
$$+ AR\{(1-AP)x^2 + (1+AP)y^2\}^2 + BR\{(1-BP)x^2 + (1+BP)y^2\}^3$$
$$+ CR\{(1-CP)x^2 + (1+CP)y^2\}^4 + DR\{(1-DP)x^2 + (1+DP)y^2\}^5$$

S2:
$$z(y) = \frac{CUY \cdot r^2}{1+\sqrt{1-(1+k)c^2 r^2}} + Ar^4 + Br^6 + Cr^8 + Dr^{10}$$

FIG.6

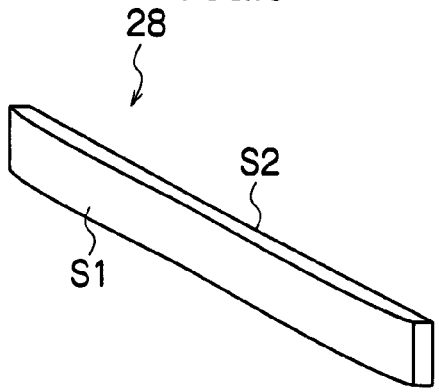

SURFACE FORMS S1: y TORIC SURFACE
S2: SURFACE AT WHICH GENERATRIX CURVATURE AND SLOW SCANNING DIRECTION CURVATURE VARY ALONG FAST SCANNING DIRECTION

S1: $$z(y) = \frac{CUY \cdot y^2}{1+\sqrt{1-(1+k)c^2 y^2}} + Ay^4 + By^6 + Cy^8 + Dy^{10}$$

S2: $$(x - x_1(y))^2 + (z - R(y))^2 = R(y)^2$$

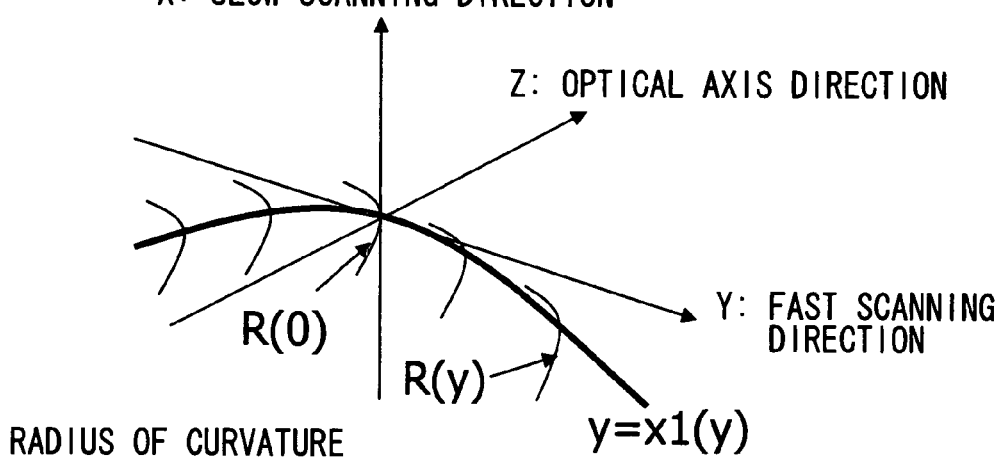

X: SLOW SCANNING DIRECTION
Z: OPTICAL AXIS DIRECTION
Y: FAST SCANNING DIRECTION
$y = x_1(y)$

RADIUS OF CURVATURE
$$R(y) = C_0 + \sum_{n=1}^{2n} B_{2n} y^{2n}$$
n=1,2,3,4,5

FORM OF GENERATRIX
$$x_1(y) = x_0 + \sum_{n=1}^{2n} A_{2n} y^{2n}$$
n=1,2,3,4,5

OPTICAL SCANNING DEVICE AND IMAGE FORMATION APPARATUS

CROSS-REFERENCE TO RELATED APPLICATIONS

This application is based on and claims priority under 35 USC 119 from Japanese Patent Application No. 2006-223085 filed Aug. 18, 2006.

BACKGROUND

1. Technical Field

The present invention relates to an optical scanning device and an image formation apparatus, and more particularly relates to an optical scanning device which deflects light beams emitted from plural light sources with a deflection element to carry out scanning exposure and an image formation apparatus including the optical scanning device.

2. Related Art

In recent years, multi-color production of a document has progressed and attempts have been made to improve the productivity of color imaging at an image formation apparatus. A color laser printer which uses plural photoreceptors to improve the productivity of color imaging has come onto the market.

In an exposure device which is used in the image formation apparatus that utilizes plural photoreceptors, a system is used in which plural scanning devices corresponding to the respective photoreceptors are arranged in a row. However, in order to reduce size, reduce number of components and further reduce cost, a system in which plural beams are deflected by a single deflector to scan the plural photoreceptors has been proposed.

As a scanning optical system for forming electrostatic latent images on photosensitive surfaces of respective photosensitive drums, there is a system in which polygon mirrors and image focusing optical systems are provided one-to-one for the respective photosensitive drums. However, providing four sets of polygon mirrors and image focusing optical systems is problematic in terms of cost. Therefore, in recent years there has been a scanning optical system in which a single polygon mirror is utilized in common and plural laser beam fluxes are simultaneously scanned therewith, and thereafter the laser beam fluxes are respectively incident at individually corresponding focusing optical systems and are guided to the respective photosensitive drums.

To respectively separately illuminate the plural light beams onto plural scanned surfaces, it is necessary to separate the plural light beams after deflective reflection by the polygon mirror, and for light sources with the same wavelength, spatial separation is necessary. A required spatial separation can be achieved by, for example, causing the light beam to be incident on a deflection surface (a reflection surface) of the polygon mirror from an oblique angle in a slow scanning plane. However, in a scanning optical device of which the optical structure is compact, because light path length for spatial separation is short, the oblique incidence angle on the reflection surface is large. Consequently, problems arise in that a scanning line on the scanned surface curves and image focusing performance deteriorates.

SUMMARY

In an aspect of the present invention, an optical scanning device includes: a light source; a first optical element that converts light emitted from the light source to parallel light; a deflection element that deflects the light in a fast scanning direction to scan a surface of an object to be scanned with the light at a constant speed; a second optical element that guides the light to the deflection element; and a third optical element that focuses the light deflected by the deflection element onto the surface of the object to be scanned, at least one surface among surfaces of the third optical element that intersect the light including a surface form which affects only one of fast scanning direction characteristics or slow scanning direction characteristics at an image plane.

BRIEF DESCRIPTION OF THE DRAWINGS

An exemplary embodiment of the invention will be described in detail with reference to the following figures, wherein:

FIGS. 4A and 4B are expanded views showing the light paths of the optical scanning device relating to the present invention.

FIG. 6 is a view showing an individual f-θ lens of the optical scanning device relating to the present invention.

DETAILED DESCRIPTION

—Basic Structure—

Figure 1:
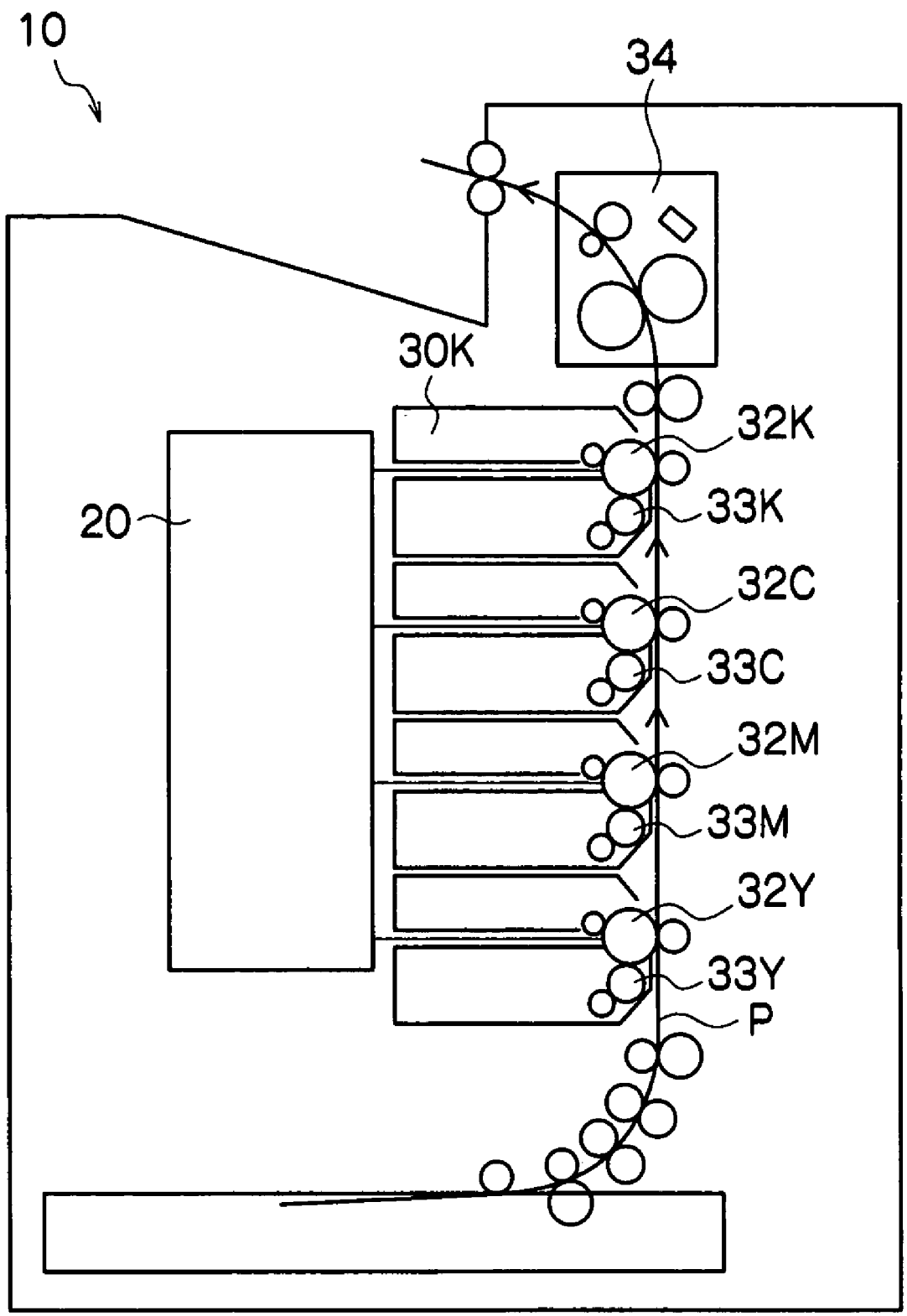
FIG. 1 is a view showing an image formation apparatus which is equipped with an optical scanning device relating to the present invention.

FIG. 1 shows an image formation apparatus which is equipped with an optical scanning device relating to an exemplary embodiment of the present invention.

For example, FIG. 1 shows a full-color laser printer provided with the optical scanning device relating to the exemplary embodiment of the present invention.

This image formation apparatus 10, as shown in FIG. 1, is structured with main portions thereof being developing devices 30Y to 30K for yellow (Y), magenta (M), cyan (C) and black (K), which include respective photoreceptor drums 32Y to 32K, charging rollers for primary charging which contact against the photoreceptor drums 32Y to 32K, and an ROS (raster output scanner) 20 which emits laser beams 31Y to 31K for the colors yellow (Y), magenta (M), cyan (C) and black (K).

The photoreceptor drums 32Y, 32M, 32C and 32K are disposed with a fixed spacing therebetween so as to have a common tangential plane, to form, what is called, a tandem-type color printer. Signals corresponding to image information for the respective colors are rasterized at an unillustrated image processing unit and inputted to the ROS 20. In a laser optical unit, the laser beams for the respective colors yellow (Y), magenta (M), cyan (C) and black (K) are modulated, and are irradiated at the photoreceptor drums 32Y to 32K of the corresponding colors.

At the above-mentioned photoreceptor drums 32Y to 32K, image formation processes for the respective colors are carried out with a well-known electrophotography system. Firstly, photoreceptor drums which use, for example, OPC photoreceptors are used as the photoreceptor drums 32Y to 32K, and these photoreceptor drums 32Y to 32K are driven to rotate. DC voltages are applied to surfaces of the photoreceptor drums 32Y to 32K by the charging rollers, and thus the surfaces are charged to around, for example, −300 V.

The laser beams 31Y to 31K corresponding to the colors yellow (Y), magenta (M), cyan (C) and black (K) are irradiated by the ROS 20, which serves as an exposure device, onto the surfaces of the photoreceptor drums 32Y to 32K to which the surface potentials have been applied, and electrostatic latent images corresponding to the inputted image information for the respective colors are formed. The laser beams 31Y to 31K are emitted by the ROS 20 and write the images. Thus, the surface potentials of image exposure portions of the photoreceptor drums 32Y to 32K are discharged at image line portions, that is, exposed areas, and the electrostatic latent images are formed.

Then, the electrostatic latent images corresponding to the colors yellow (Y), magenta (M), cyan (C) and black (K) which have been formed at the surfaces of the photoreceptor drums 32Y to 32K are developed by the developing devices 30Y to 30K of the corresponding colors. Thus, toner images of the colors yellow (Y), magenta (M), cyan (C) and black (K) are developed on the photoreceptor drums 32Y to 32K, rendering the images visible.

Developing agents formed of carriers and toners of the respective different colors yellow (Y), magenta (M), cyan (C) and black (K) are filled in the respective developing devices 30Y to 30K. These developing devices 30Y to 30K are supplied with toner from unillustrated toner supply devices, and the supplied toners are thoroughly agitated with the carrier by augers inside the developing devices 30Y to 30K and charged up by friction.

The toners, which are agitated with the carrier, and electrostatically charged by friction and supplied onto developing rollers 33, form magnetic brushes structured of the carriers and the toners, due to magnetism of magnetic rollers, and these magnetic brushes touch against the photoreceptor drums 32Y to 32K. A developing bias voltage is applied to the developing rollers 33 and the toners on the developing rollers 33 are transferred to the electrostatic latent images formed on the photoreceptor drums 32Y to 32K. Thus, the toner images of the colors yellow (Y), magenta (M), cyan (C) and black (K) are formed.

Then, positioning over paper P of the toner images of the colors yellow (Y), magenta (M), cyan (C) and black (K) that have been formed on the developing devices 30Y to 30K is implemented, and the toner images are respectively superposingly transferred. Thus, a final full-color toner image in which the colors cyan (C), magenta (M) and black (K) are respectively superposed on a monochrome Y image is formed as a four-color superposed image.

Finally, the full-color toner image of yellow (Y), magenta (M), cyan (C) and black (K) that has been formed on the paper P is heated and fused by a fixing device 34 and is fixed onto the paper P, and the image formation processing sequence ends.

—Optical Scanning Device—

Figure 2:
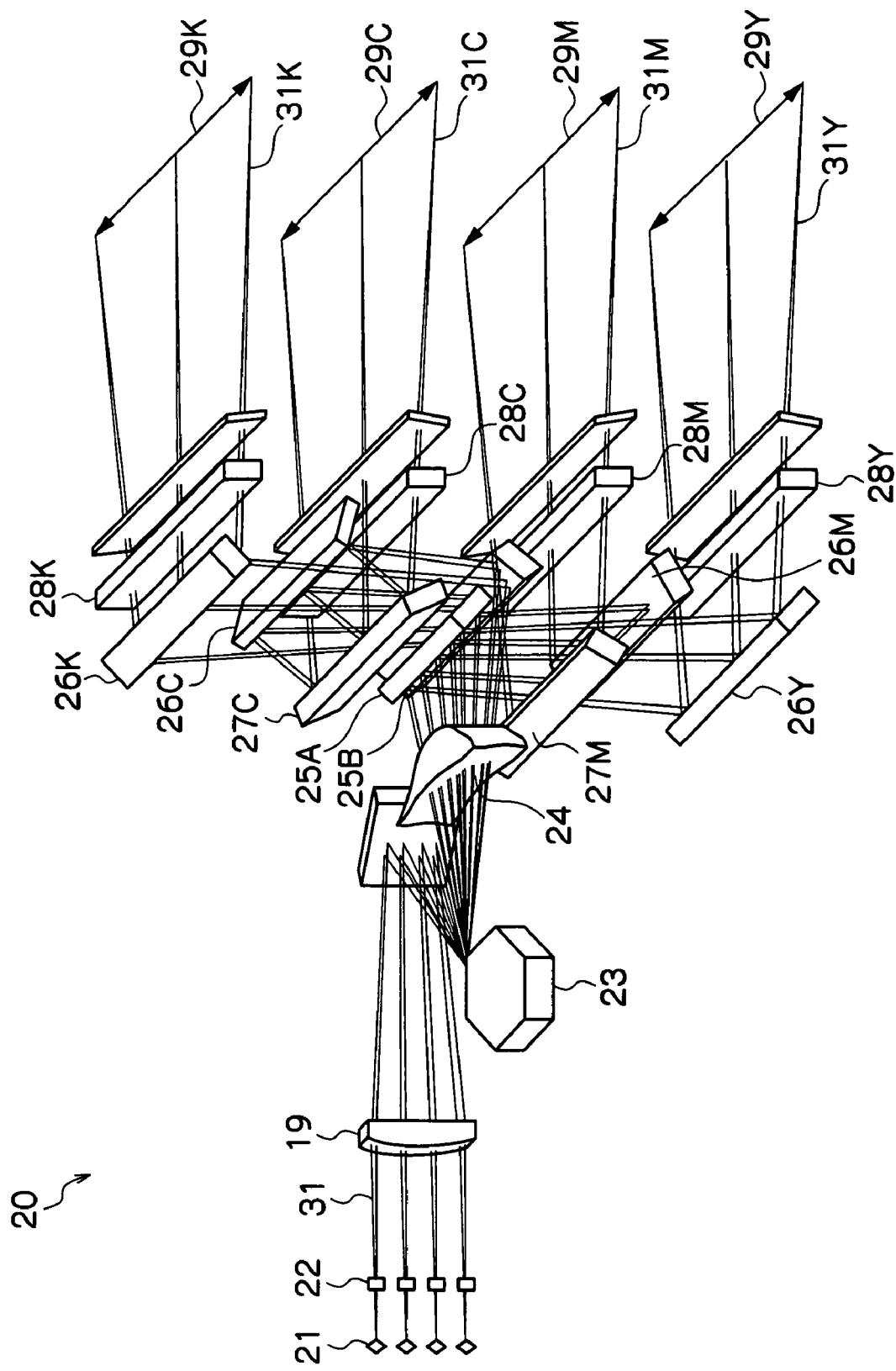
FIG. 2 is a perspective view showing the interior of the optical scanning device relating to the present invention.
Figure 3A:
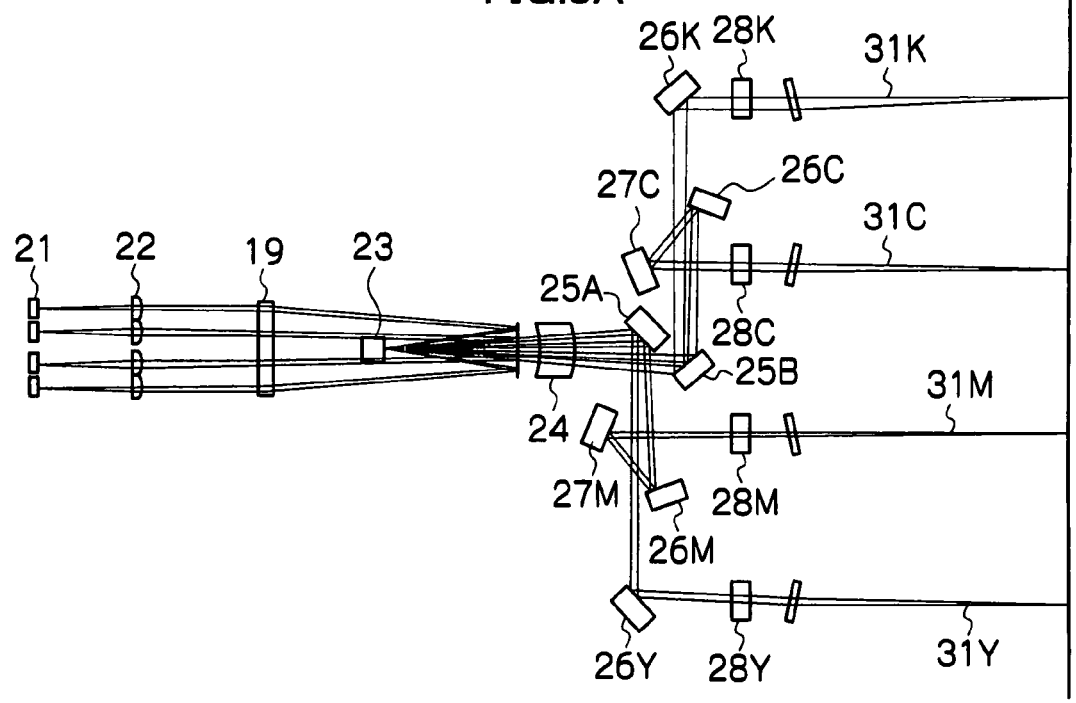
FIGS. 3A and 3B are views showing arrangements of components and light paths of the optical scanning device relating to the present invention.
Figure 3B:
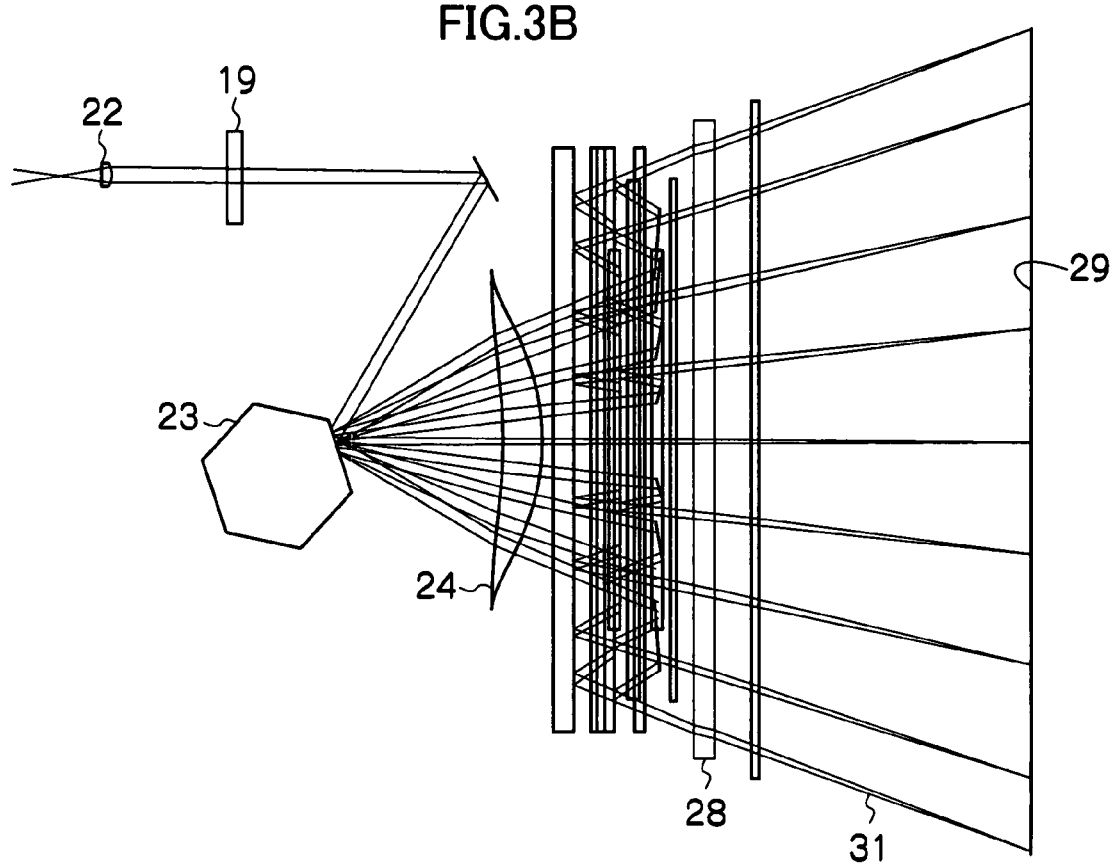

FIG. 2 shows an optical scanning device relating to the present embodiment, and FIGS. 3A and 3B show light paths of the optical scanning device.

As shown in FIG. 2, at the ROS 20, which is the optical scanning device, the laser beams 31 are emitted from respective light sources 21 for the four colors Y to K. The laser beams 31 are made to be parallel fluxes by collimator lenses 22, are focused in a fast scanning direction in line by a cylindrical lens, and are deflected in a fast scanning direction by a polygon mirror 23.

As a method for incidence of the beams onto the polygon mirror 23, tangential offset incidence, in which plural beams are provided with different angles in the fast scanning direction, sagittal offset incidence, in which plural beams are incident at respectively different angles in the slow scanning direction, and the like can be considered. In the case of the present embodiment, the laser beams 31 of the respective colors that are incident at a reflection surface 23A have respectively predetermined angles in the slow scanning direction (a vertical direction in the drawing), and are incident with offsets from one another in a sagittal direction. Thus, a size of the reflection surface 23A in the slow scanning direction can be made smaller.

However, as mentioned earlier, for light sources with the same wavelength, spatial separation is required in order to guide the light beams from the corresponding light sources for the respective colors to the photoreceptor drums 32Y to 32K. The required spatial separation can be achieved if, for example, the laser beams 31 are caused to be incident on the reflection surface 23A from directions oblique in a slow scanning sectional plane. However, if the ROS 20 is reduced in size, light path lengths for spatial separation are shorter, and therefore the oblique incidence angles at the reflection surface 23A are larger. Consequently, problems arise in that scanning lines on scanned surfaces are curved and imaging performance is adversely affected. In order to counter this, with the present embodiment, surface forms of common and individual f-θ lenses are specified as will be described later.

The laser beams 31, that have been deflected by the polygon mirror 23 are incident at a common f-θ lens 24, are divided in the slow scanning direction into two-color sets, and are incident at first mirrors 25A and 25B. That is, the laser beams 31Y and 31M for yellow (Y) and magenta (M) are incident at a first mirror 25A, and the laser beams 31C and 31K for cyan (C) and black (K) are incident at a first mirror 25B.

The laser beams 31 are further divided into one-color sets in the slow scanning direction after the first mirrors 25A and 25B, and are incident at second mirrors 26Y, 26M, 26C, 26K. That is, as shown in FIG. 3A, the laser beams 31Y and 31M are incident at second mirrors 26Y and 26M, respectively, and the laser beams 31C and 31K are incident at second mirrors 26C and 26K, respectively. The laser beams 31Y and 31K, which are closer to two ends in the slow scanning direction, are simply reflected at the second mirrors 26Y and 26K. Then, the laser beams 31Y and 31K are incident at individual f-θ lenses 28Y and 28K and are focused as scanning lines 29Y and 29K.

Meanwhile, the laser beams 31M and 31C are incident on and reflected at third mirrors 27M and 27C, respectively, are incident at individual f-θ lenses 28M and 28C, and are focused as scanning lines 29M and 29C.

Here, for the individual f-θ lenses 28Y to 28K mentioned above, rather than four lenses with individual shapes being used, a feature of the present exemplary embodiment being a structure in which light paths are symmetrical in the slow scanning direction is utilized, and sets of two individual f-θ lenses which have the same forms are used.

That is, the individual f-θ lenses 28Y and 28K are lenses which have the same forms but which differ in arrangement position and orientation, and the individual f-θ lenses 28M and 28C are lenses which have the same forms but which differ in arrangement position and orientation. Thus, for the individual f-θ lenses 28, it is sufficient to provide two kinds of lenses in sets of two for the whole apparatus, and therefore component numbers can be reduced and cost can be lowered.

Furthermore, molded products from plastic mold are used for the common f-θ lens 24, the individual f-θ lenses 28 and suchlike. Thus, there are advantages in a reduction of a number of parts (f-θ lenses and cylinder mirrors) in the scanning optical system, a reduction in thickness of the polygon mirror 23, a reduction in component costs, an improvement in a degree of freedom of layout of the optical elements, and so forth.

—Light Path and Surface Form—

FIGS. 4A and 4B show expanded views of light paths of the optical scanning device relating to the present embodiment.

As shown in FIG. 4A, in the present embodiment, the light paths of the four colors coincide in the slow scanning direction at the polygon mirror, and the individual f-θ lenses are provided for the respective colors as a final f-θ lens.

As a consequence, the occurrence of curvature of the scanning lines (bowing) is unavoidable. In a "tandem-type" color printer as for the present embodiment, it is necessary to reduce the number of lenses in order to reduce size and lower cost of the optical scanning device. Therefore, functionality that is required from each lens is greater.

However, as mentioned earlier, if a complex surface form in order to produce desirable characteristics in the fast scanning direction and a complex surface form in order to produce desirable characteristics in the slow scanning direction are applied to the same surface, independently modifying of the fast scanning direction characteristics and the slow scanning direction characteristics at a time of f-θ lens mold modification or the like in order to push initial performance, is difficult.

If a surface with a form such that fast-scanning characteristics (beam diameter, magnification and the like) and slow scanning characteristics (beam diameter, bow correction and the like) are corrected at the same surface is used at an f-θ lens, the characteristics cannot be modified independently for fast scanning and slow scanning by modifications during making of the lens (molding conditions, mold modification and the like), and establishing lens performance is difficult. For example, in a case of unsatisfactory slow scanning characteristics and satisfactory fast scanning characteristics, if the slow scanning characteristics are modified, fast scanning characteristics will deteriorate.

That is, if fast scanning direction characteristics are adjusted, slow scanning direction characteristics will also be affected thereby, and if slow scanning direction characteristics are adjusted, fast scanning direction characteristics will also be affected thereby. Therefore, it is difficult to satisfactorily adjust capabilities for both.

Accordingly, with the present embodiment, a surface form which does not feature characteristics that will affect fast scanning direction performance is applied to a surface for satisfying slow scanning direction characteristics (for example, as mentioned earlier, slow scanning direction image plane curvature correction and scanning line curvature correction in a case of sagittal offsetting), and a surface form which does not feature characteristics that will affect slow scanning direction performance is applied to a surface for satisfying fast scanning direction characteristics (linearity correction and fast scanning direction image plane curvature correction), which will be mentioned later. Thus, it is possible to implement pushing of performance of the lenses independently for the fast scanning direction and the slow scanning direction.

—Common f-θ Lens—

Figure 5:
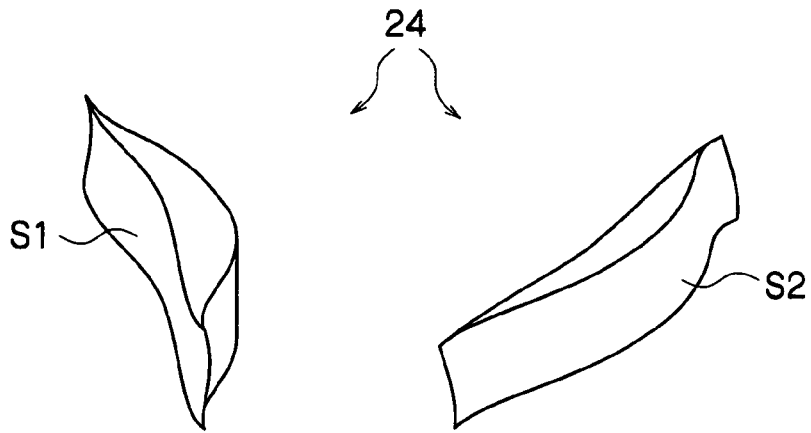
FIG. 5 is a view showing a common f-θ lens of the optical scanning device relating to the present invention.

FIG. 5 shows a common f-θ lens of an optical scanning device relating to the present embodiment.

As shown in FIG. 5, in the present embodiment, in the common f-θ lens 24, if a surface of at which the laser beam 31 is incident is S1 and a surface of from which the laser beam 31 is emitted is S2, the incidence surface S1 is an anamorphic aspherical surface, and the emission surface S2 is a y toric surface.

Now, in the emission surface S2 which is a y toric surface, curvature in an x direction, that is, the slow scanning direction, is always constant, and the emission surface S2 has a surface form which is made by rotating a form represented by z(y) mentioned below about a y axis.

That is, if

CUY is a fast scanning direction curvature at an optical axis origin,

K is a conic constant, and

A, B, C and D are higher-order coefficients in the y-axis direction, then the emission surface S2 of the common f-θ lens 24 is represented by the equation:

$$z(y) = \frac{CUY \cdot y^2}{1 + \sqrt{1 - (1+k)c^2 y^2}} + Ay^4 + By^6 + Cy^8 + Dy^{10}$$

Furthermore, if

CUX is a slow scanning direction curvature at the optical axis origin,

CUY is the fast scanning direction curvature at the optical axis origin,

Kx is a conic constant in the slow scanning direction

Ky is a conic constant in the fast scanning direction

AR, BR, CR and DR are even-order coefficients of rotational symmetry,

AP, BP, CP and DP are odd-order coefficients of rotational symmetry, and $C_o$ is a slow scanning direction radius of curvature at the optical axis origin, then the incidence surface S1 of the common f-θ lens 24 is represented by the equation:

$$z = \frac{CUX \cdot x^2 + CUY \cdot y^2}{1 + \sqrt{1 - (1+kx) \cdot CUX^2 \cdot x^2 - (1+ky) \cdot CUY^2 \cdot y^2}} + \\ AR\{(1-AP)x^2 + (1+AP)y^2\}^2 + BR\{(1-BP)x^2 + (1+BP)y^2\}^3 + \\ CR\{(1-CP)x^2 + (1+CP)y^2\}^4 + DR\{(1-DP)x^2 + (1+DP)y^2\}^5$$

—Individual f-θ Lens—

FIG. 6 shows an individual f-θ lens of an optical scanning device relating to the present embodiment.

As shown in FIG. 6, in the present embodiment, in the individual f-θ lens 28, if a surface at which the laser beam 31 is incident is S1 and a surface from which the laser beam 31 is emitted is S2, the incidence surface S1 is a y toric surface, and the emission surface S2 is a surface which is made by linking circular arcs which have curvature radii R(y) determined for positions y in the fast scanning direction with a generatrix produced by x1(y) in the x-y plane serving as peak points. This emission surface S2 is a surface at which the generatrix curves and the curvature in the slow scanning direction varies along the fast scanning direction.

The incidence surface S1 of the individual f-θ lens 28 is defined by an equation the same as for the above-described emission surface S2 of the common f-θ lens 24.

On the other hand, the emission surface S2 of the individual f-θ lens 28 is described by the equations:

$$(x - x_1(y))^2 + (z - R(y))^2 = R(y)^2$$

$$x_1(y) = x_0 + \sum_{n=1}^{2n} A_{2n} y^{2n}$$

$$R(y) = C_0 + \sum_{n=1}^{2n} B_{2n} y^{2n}$$

$C_0$ is a slow scanning direction radius of curvature at the optical axis origin, $B_{2n}$, is a higher-order coefficient, with respect to a fast scanning direction, of a slow scanning direction radius of curvature, $X_0$, $A_{2n}$ each is a form of generatrix in a slow scanning direction.

$C_0$, $B_{2n}$, $X_0$, $A_{2n}$ are handled as variables in designing. After the desired characteristics are obtained, these become constants which express surface form.

If the variables $C_0$, $B_{2n}$, $X_0$, $A_{2n}$, etc. used in these equations are altered, they will have no effect at all on fast scanning direction characteristics, as described below.

Because the surface form of the emission surface S2 is prescribed as described above, situations in which slow scanning direction performance is affected when fast scanning direction characteristics are adjusted, or fast scanning direction performance is affected when slow scanning direction characteristics are adjusted can be prevented.

That is, a surface form which does not provide characteristics that will affect fast scanning direction performance is applied to a surface for satisfying slow scanning direction characteristics (for example, as mentioned earlier, slow scanning direction image plane curvature correction and scanning line curvature correction at a time of sagittal offsetting), which is to say the emission surface S2 of the individual f-θ lens. Conversely, a surface form which does not provide characteristics that will affect slow scanning direction performance is applied to a surface for satisfying fast scanning direction characteristics (linearity correction and fast scanning direction image plane curvature correction). Thus, it is possible to implement pushing of capabilities of the lenses independently for the fast scanning direction and the slow scanning direction.

—Lens Characteristics—

FIGS. 7 to 11C show design performances of color registration characteristics and imaging characteristics of the optical scanning device relating to the present embodiment.

As shown in FIG. 3A, in the optical scanning device relating to the present embodiment, pairs of the individual f-θ lenses 28 with respectively different forms are used for the outer side two colors (the colors Y and K) and the inner side two colors (the colors M and C), and various characteristics principally differ between these two systems.

Figure 7:
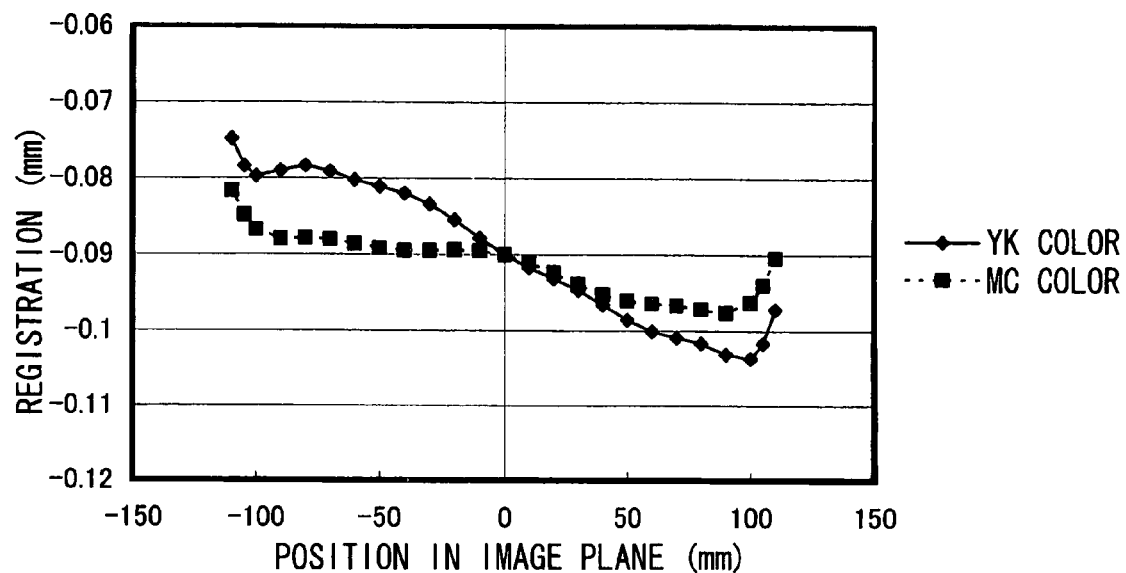
FIG. 7 is a graph showing forms of scanning lines of different colors at the optical scanning device relating to the present invention.
Figure 8:
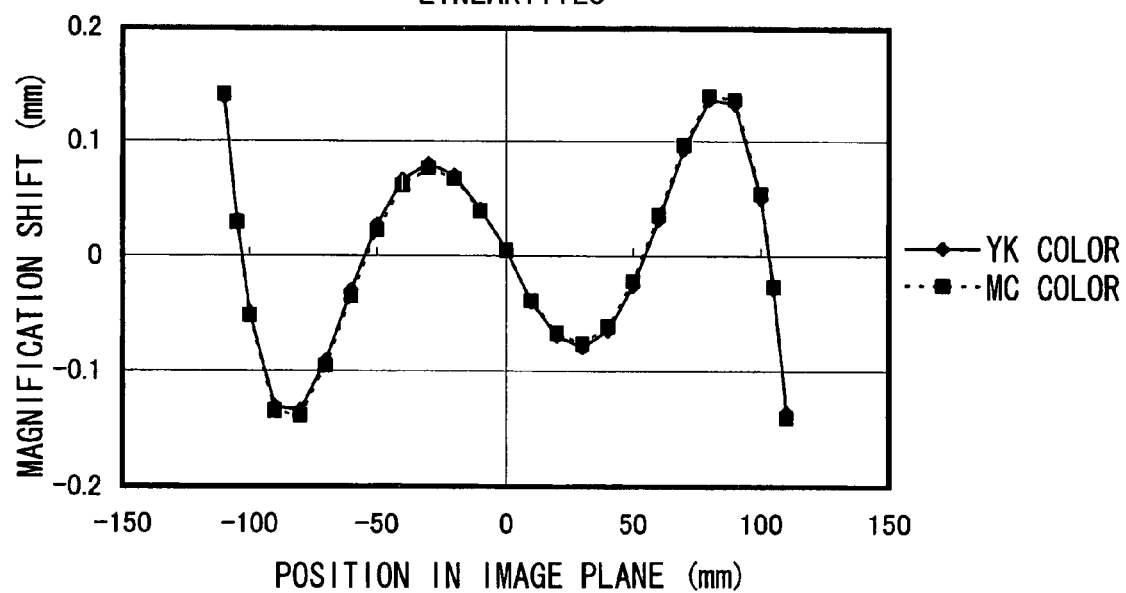
FIG. 8 is a graph showing magnification shifts of the different colors at the optical scanning device relating to the present invention.

With a center in the fast scanning direction being 0, shapes of scanning lines of the laser beams 31 are shown in FIG. 7 and linearities (magnification shifts) are shown in FIG. 8.

As shown in FIG. 7, the shapes of the laser beams 31 are substantially flat for both the outer side two colors (the colors Y and K) and the inner side two colors (the colors M and C), and offset between scanning lines of those colors over the whole of a scanning region is kept to below a few μm. With regard to inclinations of the scanning lines, the scanning lines of the respective colors can be made to respectively coincide by rotation adjustment of the individual lenses in a plane which is perpendicular to the optical axes.

As shown in FIG. 8, there are substantially no differences in magnification variation characteristics between the outer side two colors (the colors Y and K) and the inner side two colors (the colors M and C), and these can similarly be kept to below a few microns over the whole of the scanning region.

Figure 9:
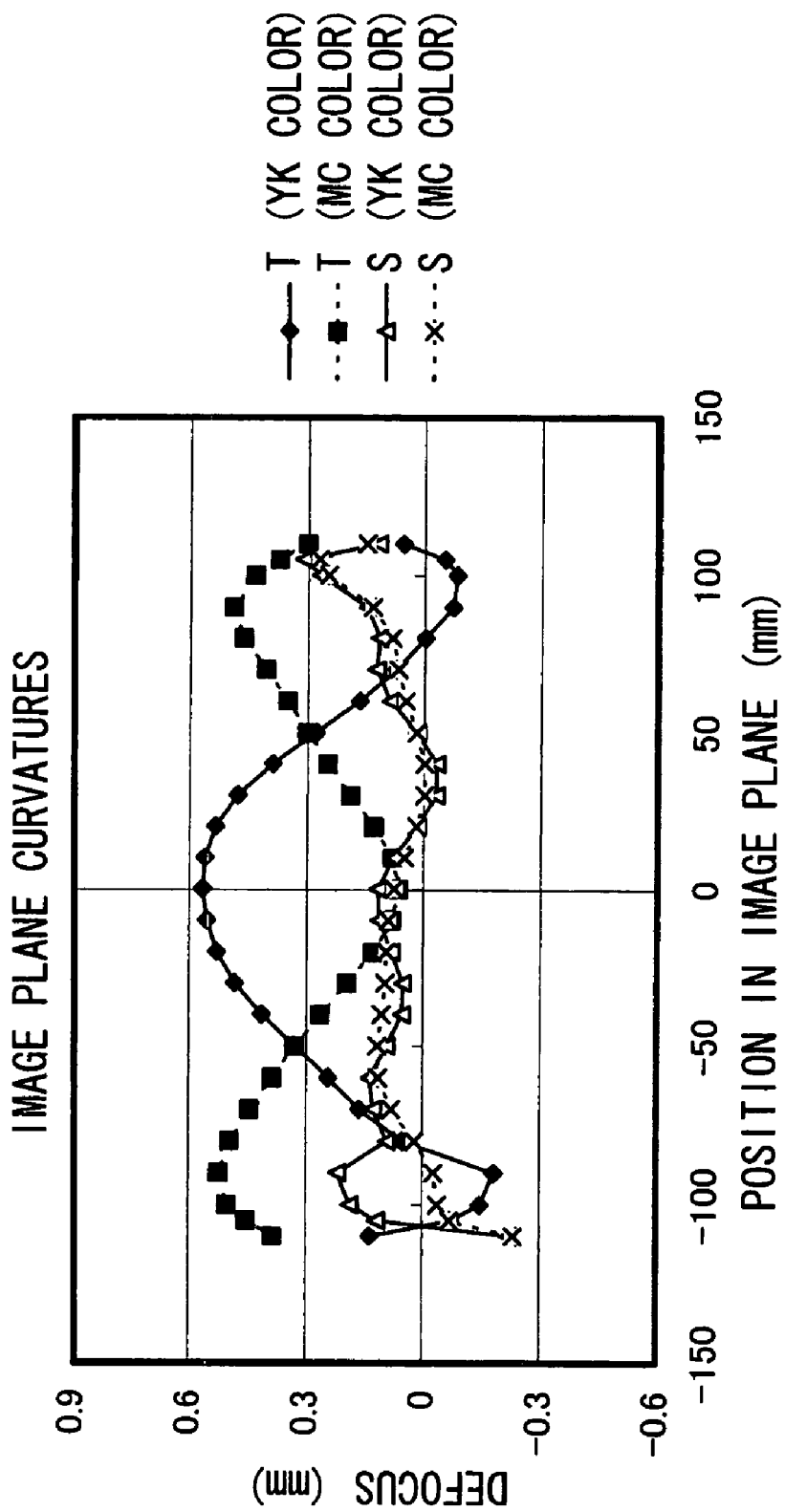
FIG. 9 is a graph showing image plane curvatures separately for sagittal and tangential directions at the optical scanning device relating to the present invention.

FIG. 9 shows an image plane curvature characteristic with the center in the fast scanning direction being 0.

As shown in FIG. 9, defocus values for all the colors are kept to within 1.0 mm peak-to-peak, and the image plane curvature characteristic is excellently corrected.

Accordingly, in order to adjust characteristics in a sagittal direction while maintaining characteristics in a meridional direction, a structure of the present embodiment is used, that is, a surface form which does not feature characteristics that will affect fast scanning direction performance is applied to a surface for satisfying slow scanning direction characteristics (for example, correction of beam diameter in the sagittal direction). Thus, it is possible to correct an image plane curvature characteristic without unpreferably affecting characteristics in the meridional direction.

Figure 10A:
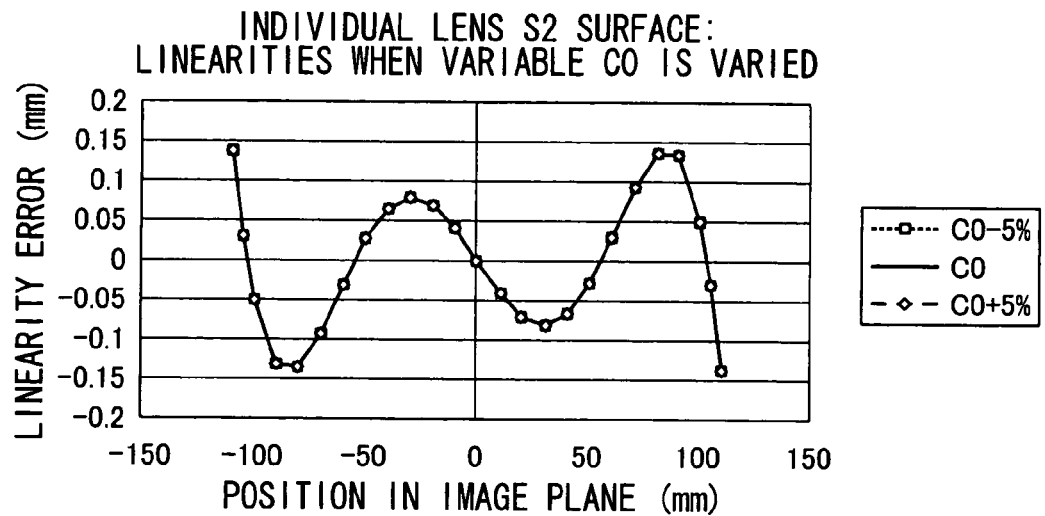
FIGS. 10A, 10B and 10C are graphs showing variations in characteristics in the fast and slow scanning directions when a variable C0 of an S2 surface of the individual f-θ lens is varied in the optical scanning device relating to the present invention.
Figure 10B:
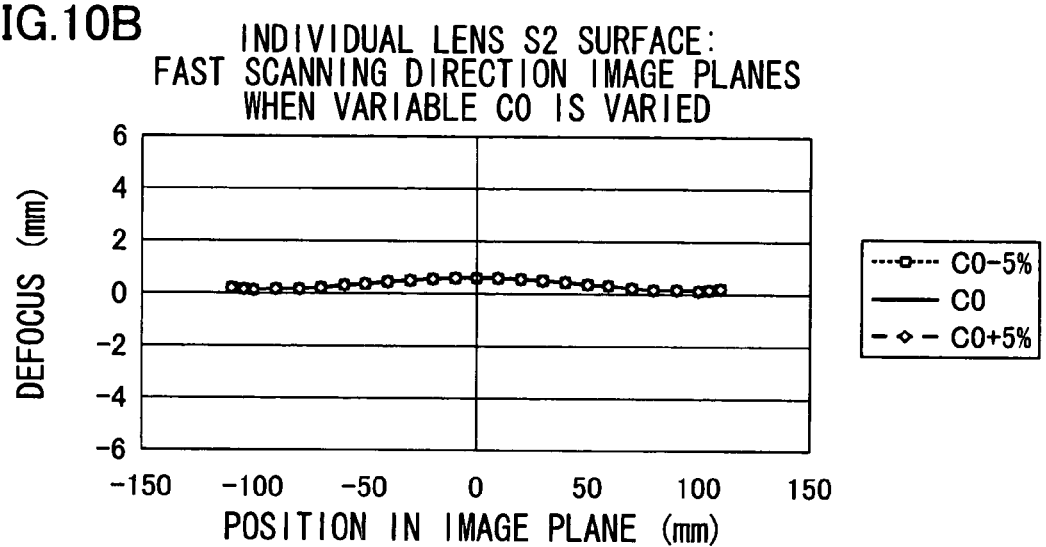
Figure 10C:
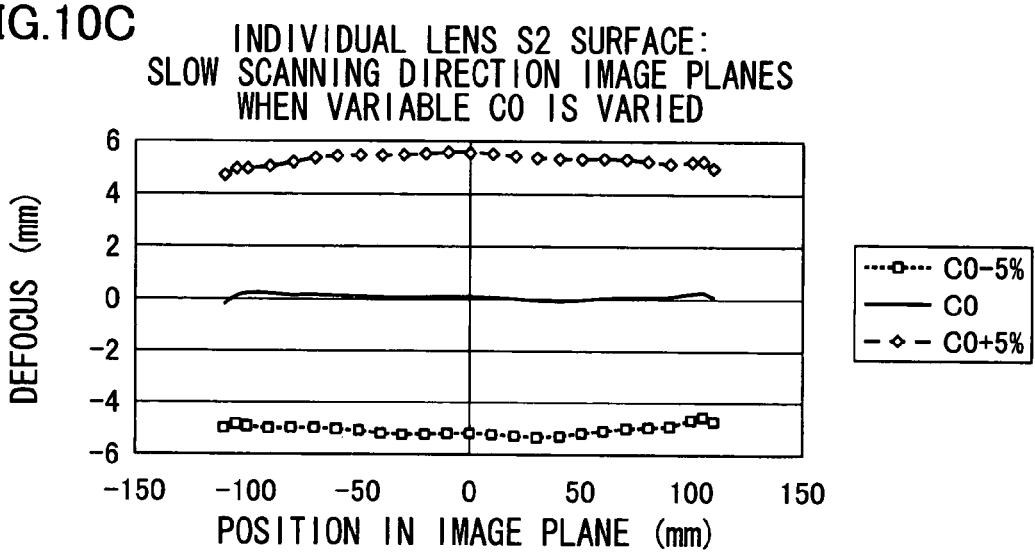

For example, as shown in FIGS. 10A to 10C, the variable C0 of the S2 surface of the individual f-θ lens 28 relating to the present embodiment, that is, the slow scanning direction radius of curvature at the optical axis origin, is altered by −5% to +5%, and fast scanning direction characteristics (linearities and fast scanning image planes) and slow scanning direction image plane positions are compared for these cases. Here, even though slow scanning direction image plane position is shifted as shown in FIG. 10C, the fast scanning direction characteristics hardly change at all, as shown in FIGS. 10A and 10B. Thus, it is possible to move slow scanning direction image plane position without affecting fast scanning characteristics.

Figure 11A:
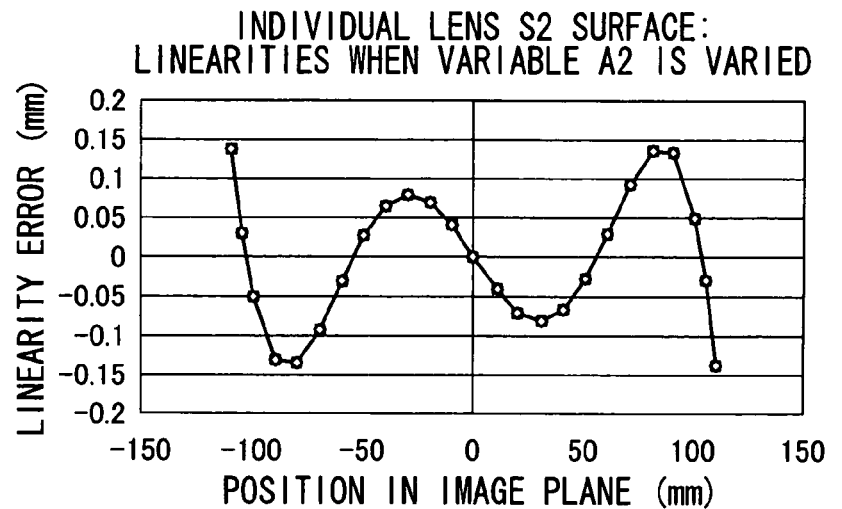
FIGS. 11A, 11B and 11C are graphs showing variations in characteristics in the fast and slow scanning directions when a variable A2 of the S2 surface of the individual f-θ lens is varied in the optical scanning device relating to the present invention.
Figure 11B:
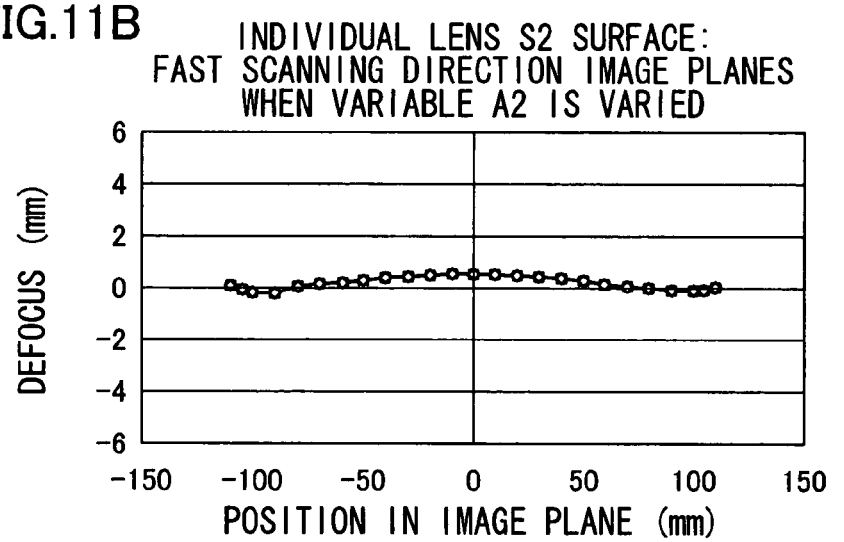
Figure 11C:
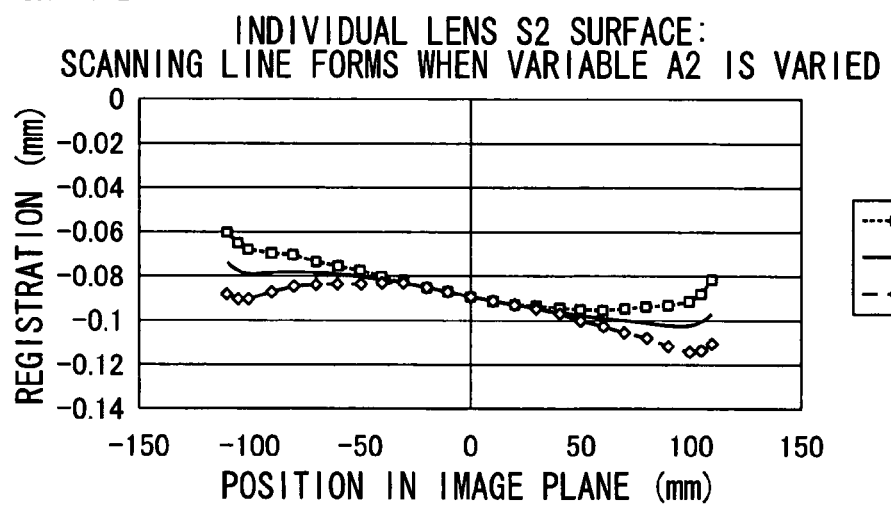

Alternatively, as shown in FIGS. 11A to 11C, the variable A2 of the S2 surface of the individual f-θ lens 28 relating to the present embodiment, that is, a coefficient which determines the form of the generatrix, is altered by −5% to +5%, and fast scanning direction characteristics (linearities and fast scanning image planes) and scanning line forms are compared for these cases. Here, even though the scanning line form is changed as shown in FIG. 11C, the fast scanning direction characteristics hardly change at all, as shown in FIGS. 11A and 11B. Thus, it is possible to adjust the scanning line form without affecting fast scanning characteristics.

—Concluding Remarks—

In the present embodiment as described above, a surface form which does not feature characteristics that will affect fast scanning direction performance is applied to a surface for satisfying slow scanning direction characteristics (for example, slow scanning direction image plane curvature correction and scanning line curvature correction in a case of sagittal offsetting), and a surface form which does not feature characteristics that will affect slow scanning direction performance is applied to a surface for satisfying fast scanning direction characteristics (linearity correction and fast scanning direction image plane curvature correction). Therefore, it is possible to adjust characteristics of the lenses independently for the fast scanning direction and the slow scanning direction, and to pursue optical performance.

—Other Remarks—

An exemplary embodiment of the present invention has been described hereabove, but the present invention is not in any way limited to the example described above, and obviously various embodiments are possible within a scope not departing from the spirit of the present invention.

That is, although the present exemplary embodiment is applied to a tandem-type full-color image formation apparatus, this is not a limitation. Obviously, for example, single-color monochrome image formation apparatus, image formation apparatus of three colors or less, and the like may also be used.

What is claimed is:

1. An optical scanning device comprising:
   a light source;
   a first optical element that converts light emitted from the light source to parallel light;
   a deflection element that deflects the light in a fast scanning direction to scan a surface of an object to be scanned with the light at a constant speed;
   a second optical element that guides the light to the deflection element; and
   a third optical element that focuses the light deflected by the deflection element onto the surface of the object to be scanned, at least one surface among surfaces of the third optical element that intersect the light including a surface form which affects only one of fast scanning direction characteristics or slow scanning direction characteristics at an image plane,
   wherein the at least one surface among the surfaces of the third optical element that intersect the light includes a surface form that corrects, in the slow scanning direction, a scanning line form and a focusing characteristic along the surface to be scanned, and that does not have lens power in the fast scanning direction, and
   the at least one surface is described by the following equation, with coordinates being represented by (x,y,z), coordinate in the slow scanning direction being x, coordinate in the fast scanning direction being y, and coordinate in an optical axis direction being z,
   $C_0$ being a radius of curvature in the slow scanning direction at an optical axis origin, $B_{2n}$, being a higher-order coefficient, with respect to the fast scanning direction, of a slow scanning direction radius of curvature, $X_0$, $A_{2n}$ each being a form of generatrix in a slow scanning direction,
   the at least one surface being a surface which is made by linking circular arcs which have curvature radii $R(y)$ determined for positions y in the fast scanning direction with a generatrix produced by $x_1(y)$ in the x-y plane serving as peak points, $$(x - x_1(y))^2 + (z - R(y))^2 = R(y)^2$$

$$x_1(y) = x_0 + \sum_{n=1}^{2n} A_{2n} y^{2n}$$

-continued $$R(y) = C_0 + \sum_{n=1}^{2n} B_{2n} y^{2n}.$$

2. The optical scanning device of claim 1, wherein the light lights that are incident at the deflection element are incident at angles with respect to the slow scanning direction.

3. The optical scanning device of claim 1, wherein the at least one surface among the surfaces of the third optical element that intersect the light includes a surface form that corrects image plane curvature and scanning line curvature in the slow scanning direction.

4. The optical scanning device of claim 1, wherein the third optical element comprises a plurality of lenses.

5. The optical scanning device of claim 1, wherein with a plurality of the lights from a plurality of the light sources, scanning of a plurality of the surfaces to be scanned of a plurality of the objects to be scanned is carried out.

6. The optical scanning device of claim 1, wherein the third optical element comprises a first fθ lens to which the light from the deflection element is incident, and a second fθ lens to which the light emitted from the first fθ lens is incident.

7. The optical scanning device of claim 6, wherein an emission surface of the second fθ lens includes a surface form which does not affect the fast scanning direction characteristics but affects the slow scanning direction characteristics at an image plane.

8. The optical scanning device of claim 7, wherein an incident surface of the first fθ lens is an anamorphic aspherical surface, an emission surface of the first fθ lens is a y toric surface, and an incident surface of the second fθ lens is a y toric surface.

9. The optical scanning device of claim 1, wherein the third optical element is a molded lens which is formed by molding.

10. The optical scanning device of claim 5, wherein the second optical element guides each of the plurality of the lights, in the fast scanning direction, to the deflection element in a line.

11. An image formation apparatus comprising:
    an optical scanning device comprising
    a light source,
    a first optical element that converts light emitted from the light source to parallel light,
    a deflection element that deflects the light in a fast scanning direction to scan a surface of an object to be scanned with the light at a constant speed,
    a second optical element that guides the light to the deflection element, and
    a third optical element that focuses the light deflected by the deflection element onto the surface of the object to be scanned, at least one surface among surfaces of the third optical element that intersect the light including a surface form which affects only one of fast scanning direction characteristics or slow scanning direction characteristics at an image plane;
    a charging device that charges the surface of the object;
    a developing device that develops a latent image formed on the surface of the object to form a toner image; and
    a transfer device that transfers the toner image onto a recording medium,
    wherein the at least one surface among the surfaces of the third optical element that intersect the light includes a surface form that corrects, in the slow scanning direction, a scanning line form and a focusing characteristic along the surface to be scanned, and that does not have lens power in the fast scanning direction, and the at least one surface is described by the following equation, with coordinates being represented by (x,y,z), coordinate in the slow scanning direction being x, coordinate in the fast scanning direction being y, and coordinate in an optical axis direction being z, $C_0$ being a radius of curvature in the slow scanning direction at an optical axis origin, $B_{2n}$, being a higher-order coefficient, with respect to the fast scanning direction, of a slow scanning direction radius of curvature, $X_0$, $A_{2n}$ each being a form of generatrix in a slow scanning direction, the at least one surface being a surface which is made by linking circular arcs which have curvature radii R(y) determined for positions y in the fast scanning direction with a generatrix produced by x1(y) in the x-y plane serving as peak points, $$(x - x_1(y))^2 + (z - R(y))^2 = R(y)^2$$

$$x_1(y) = x_0 + \sum_{n=1}^{2n} A_{2n} y^{2n}$$

$$R(y) = C_0 + \sum_{n=1}^{2n} B_{2n} y^{2n}.$$

* * * * *